United States Statutory Invention Registration [19]

[11] Reg. Number: H48

Heichel

[45] Published: Apr. 1, 1986

[54] METHOD OF MAKING A CERAMIC ARTICLE HAVING OPEN POROUS INTERIOR

[75] Inventor: Dewey N. Heichel, Framingham, Mass.

[73] Assignee: Kennecott Corporation, Cleveland, Ohio

[21] Appl. No.: 584,431

[22] Filed: Feb. 28, 1984

[51] Int. Cl.[4] ..... B29C 27/60
[52] U.S. Cl. ..... 264/44; 210/510.1
[58] Field of Search ..... 264/44

[56] References Cited

U.S. PATENT DOCUMENTS

| | | | |
|---|---|---|---|
| 2,996,389 | 8/1961 | Fernhof | 264/44 |
| 3,090,094 | 5/1963 | Schwartzwalder | 264/44 |
| 3,097,930 | 7/1963 | Holland | 264/44 |
| 3,111,396 | 11/1963 | Ball | 264/44 |
| 3,640,787 | 2/1972 | Heller | 264/DIG. 7 |
| 3,939,079 | 2/1976 | Uchiyama et al. | 210/510 |
| 3,947,363 | 3/1976 | Pryor et al. | 210/510 |
| 4,024,212 | 5/1977 | Dore et al. | 264/44 |
| 4,024,212 | 5/1977 | Dore et al. | 264/44 |
| 4,056,586 | 11/1977 | Pryor et al. | 264/44 |
| 4,307,051 | 12/1981 | Sargeant et al. | 264/53 |
| 4,343,704 | 8/1982 | Brockmeyer | 210/510 |

FOREIGN PATENT DOCUMENTS

| | | | |
|---|---|---|---|
| 0067627 | 12/1982 | European Pat. Off. . | |
| 2281820 | 3/1976 | France | 264/44 |

*Primary Examiner*—Edward A. Miller
*Attorney, Agent, or Firm*—David M. Ronyak

[57] ABSTRACT

An open porous ceramic article having an outer skin and an open porous interior. The interior has a continuous matrix of ceramic material which includes a plurality of chambers of predetermined shape and size distributed throughout the matrix. The chambers are in communication with one another; the passageways are smaller in cross-sectional area than the chambers connected thereby. With its skin removed, the article may be used as a filter for molten metal. With its skin intact, the article is useful as thermal insulation.

The open porous ceramic article may be made by coating a predetermined volume of thermally degradable beads with a predetermined quantity of binder capable of taking a set and thereafter molding the coated beads under pressure in a mold until the binder is set. A slurry of ceramic material fills the interstices of the mass of the coated beads. After the ceramic slurry has set, the resulting block is dried to remove the excess moisture from the ceramic material. Thereafter the dried block is heated to cause the beads to degrade and volatilize leaving a porous block of ceramic greenware which is thereafter further heated to complete manufacture of the article. The coated beads may be formed into a porous block in a mold prior to introduction of the ceramic slurry. Alternatively, the coated beads and the ceramic slurry may be mixed together before molding.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MAKING A CERAMIC ARTICLE HAVING OPEN POROUS INTERIOR

BACKGROUND OF THE INVENTION

1. Field of the Invention

This invention relates to a porous ceramic article, the pores of which are in communication with one another. The article may be used as a filter, particularly for molten metals, for example, aluminum.

2. Description of the Prior Art

U.S. Pat. No. 3,939,079 discloses a filter medium which can be prepared by blending one hundred parts by weight of aggregate particles of at least one of fused alumina, sintered alumina, silicon carbide, and silicon nitride, 5–18 parts by weight of an inorganic bonding material having a chemical composition of about 10 to about 50 percent by weight of $SiO_2$ and about 5 and about 20 percent by weight of $B_2O_3$ and containing a major proportion of non-vitreous substance, and about 3 to about 15 parts by weight of a combustible substance such as grain powder, coke powder or an organic resin powder, kneading the mixture with necessary amounts of a caking material and water, molding the kneaded mixture, drying the molded, kneaded mixture and thereafter calcining the dried mixture at a temperature not lower than about 1100° C., during which time a number of air permeable pores of constant size are formed as a result of burning a combustible substance or the evolution of decomposition gases. The size and number of air permeable pores present in such filter medium are controlled by adjusting the amounts of bonding material and combustible substance, rather than relying on particle size of the aggregate as in the production of conventional filter media using a vitreous bonding material.

U.S. Pat. No. 3,097,930 discloses a method of making a porous shape of sintered refractory material by impregnating a sponge shape with a suspension or dispersion of refractory particles in a liquid followed by removal of the liquid and material of the sponge by heating in an inert atmosphere to break down and volatilize the sponge material and thereafter further heating to sinter the refractory particles together.

U.S. Pat. No. 3,947,363 teaches that porous ceramic foam material particularly useful in filtering molten metal can be prepared by impregnating an open cell flexible organic foam material with an aqueous slurry of ceramic material. The impregnated sponge is thereafter compressed to expel a portion of the slurry while leaving the web coated with slurry. The impregnated sponge is thereafter released from compression so that the web remains coated and the material is dried. The dried material is then heated to first burn out the flexible organic foam and then to sinter the ceramic coating thereby providing a fused ceramic foam having a plurality of intricate connected voids surrounded by a web of bonded or fused ceramic in the configuration of the flexible foam. This procedure is fully described in U.S. Pat. No. 3,893,917.

U.S. Pat. No. 4,024,212 describes the preparation of ceramic foams by the impregnation of open-celled organic polymer foam material possessing a predetermined permeability and resilience with an aqueous slurry of a thixotropic ceramic composition by passing the foam at least twice through preset rollers thereafter drying the resulting material and heating to remove the organic foam component.

U.S. Pat. No. 4,056,586 describes a method of preparing a molten metal filter by impregnating an open cell hydrophilic flexible organic foam material with an aqueous ceramic slurry, thereafter compressing the foam material to expel a portion of the slurry while leaving the web-coated therewith, releasing the compression so the web remains coated with slurry, drying the coated material, and heating the dried material to first burn out the flexible organic foam and then sinter the ceramic coating to provide a new ceramic foam having a plurality of interconnected voids surrounded by a web of fused ceramic in the configuration of the flexible foam.

U.S. Pat. No. 4,307,051 describes a process for manufacturing a light-weight refractory product by taking a particulate pore-forming material or a mixture of refractory raw material with a particulate pore-forming material, providing the individual particles of the pore-forming material or agglomerates of particles or agglomerates of the mixture with a wet exterior, coating said wet exterior with dry refractory raw material and firing the aggregate so produced. Expanded polystrene in the form of hollow spheres is taught to be a desirable particulate combustible material. The process described results in the production of a loosely sintered aggregate that is easily broken down into individual hollow particles, the vast majority of which are in the form of small hollow spheres.

SUMMARY OF THE INVENTION

According to an aspect of the invention there is provided a method of making a ceramic article having an open porous interior by coating a predetermined volume of thermally degradable beads with a predetermined quantity of a binder that is capable of being set, thereafter placing the coated beads in a mold, thereafter applying pressure to the coated beads in the mold and maintaining such pressure until the binder sets resulting in formation of a porous block, thereafter impregnating the porous block with a slurry of ceramic material, thereafter drying the impregnated block, thereafter heating the dried impregnated block to cause the beads to degrade and volatilize leaving a block or porous ceramic greenware, and thereafter further heating the block of ceramic greenware to produce a ceramic article. The size of the pores is determined by the size or sizes of beads that are employed.

According to another aspect of the invention there is provided a method of making a ceramic particle having an open porous interior which includes the steps of coating a predetermined volume of thermally degradable beads with a predetermined quantity of a binder that is capable of being set; mixing the precoated beads with an aqueous slurry of ceramic material; placing the resulting mixture in a mold and applying pressure to the mixture thereby squeezing out the excess aqueous ceramic slurry and causing the coated beads to contact one another; maintaining the beads in contact with one another until the binder is set to form a body; thereafter drying the body; thereafter heating the dried body to cause the organic beads to degrade and volatilize leaving an open porous body of ceramic greenware and thereafter further heating the block of open porous ceramic greenware to form an open porous ceramic article. The size of the pores is determined by the size or sizes of organic beads employed. The size of the passageways which interconnect the pores is determined by the size of the beads as well as the amount of binder employed.

According to another aspect of the invention, there is provided a porous ceramic article comprising a continuous matrix of ceramic material including a plurality of chambers of a predetermined shape and size distributed throughout the matrix wherein said chambers are in communication with one another via passageways whose area available for fluid flow is less than that of the chambers brought into communication thereby.

DETAILED DESCRIPTION OF THE INVENTION

Open porous ceramic articles according to the present invention have a highly porous interior due to their method of manufacture. Any thermally degradable substance (by combustion or otherwise) whose coefficient of thermal expansion is less than that of the ceramic material (particularly when in its green state) may be employed for the beads. Preferred are organic foams such as pre-expanded polystyrenes and polyurethanes. It is especially preferred to utilize spheres of a pre-expanded polystyrene foam beads as the void inducing member. Such beads are available in a variety of sizes. Those found to be most suitable for the manufacture of an open-cell ceramic foam material suitable for use as a molten metal filter range in diameter from about 1 to about 6 millimeters. Preferrably in a manufacture of a given ceramic foam material that is intended to be used as a molten metal filter the organic beads are of substantially uniform spherical size and range in diameter from about 3 to about 6 millimeters. In other words, in any given article a narrow size distribution of spherical beads is desirable. However, it is within the scope of the invention to employ beads of a material other than pre-expanded polystyrene foam. It is also within the scope of the invention to employ particles of combustible material that of a shape other than spherical, for example, cylindrical or spiral, or to use combinations of any of these sizes and shapes as well as combinations of different compositions of combustible materials.

Preferred binders are those which are organic in nature and capable of being broken down and volatilized on exposure to a sufficient temperature less than that required to fully develop the desired properties of the finished ceramic matrix. A particularly preferred binder is a chemically reactive epoxy resin. Preferrably the binder is thixotropic in nature to facilitate coating of the beads therewith, but to inhibit flow of the binder from the previously coated beads. Other organic binders such as Canadian balsam (pine sap) have been used successfully. The required properties of the binder include (A) that the binder be capable of coating the beads uniformly with a thin coating;

(B) that the binder be self-adherent so that two beads that have been coated when brought into contact with one another will adhere to one another at their point of contact;

(C) that the binder be capable of taking a set such that after the coated beads are brought into contact with one another and held in such position for a specified time under specified conditions that the beads will become firmly attached to one another at their point of contact;

(D) that the binder not flow from the beads thereby completely filling the interstices between them;

(E) that the binder be capable of being decomposed and volatilized at a temperature less than that sufficient to sinter or fuse the ceramic material of which the article is being formed; and (F) that such decomposition and volatilization occur in the absence of sufficient thermal expansion to cause rupture of the ceramic greenware.

Preferably, the ratio of predetermined volume of beads to predetermined volume of binder is from about 20/1 to 40/1.

Slurries suitable for manufacture of porous ceramic articles according to the present invention may comprise any suitable ceramic material suitable for the intended and use or service conditions for the open porous ceramic article. The slurry should be of low viscosity to facilitate filling of the interstices of the porous block. The ceramic particles of the slurry should be of small size, e.g. not larger than about 200 mesh so as to be able to flow into the interstices between the beads. Use of too large a particle size may result in difficulty in filling the interstices of the porous block with the slurry and separation of the slurry into fractions. It is desirable to include up to about two weight percent of a very fine silica-containing powder such as that collected from the filtration system of calcination kilns. This silica powder imparts thixotropic properties to the slurry which helps it flow into the interstices when pressure is applied to the system. The shear forces present in the slurry (when it moves through the interstices) allow the slurry to become fluid. As soon as the pressure (or shear inducing movement) is removed, the slurry thickens which prevents it from draining out of the interstices. The slurry of ceramic material should be capable of taking a chemically induced set. This can be achieved by inclusion of a hydraulically setting cement such as a calcium aluminate cement or a chemical setting agent, e.g. phosphate bonded ceramics. Calcium aluminate cement hydrates upon contact with the water in the aqueous ceramic slurry causing it to set into a solid after being introduced into the porous network of beads. Cement is used to impart strength unto the ceramic greenware body after the beads have been volatilized; otherwise, the structure will crumble.

Fluid property modifiers, such as Darvan$^{TM}$, available from W. R. Grace and Company, Organic Chemicals Division, may be employed in the slurry to adjust its rheology. Darvan$^{TM}$ is a polymer ion deflocculant which modifies the surface of the clay particles (Kaolin).

A suitable slurry of ceramic material is prepared by mixing together on a dry weight basis, the following ingredients: 2 percent fumed silica powder, 10 percent calcium aluminate hydraulically setting cement, 3 percent $ZrO_2$ flour, 2 percent kaolin, 23 percent calcined alumina, 60 percent tabular alumina of 300–325 mesh particle size with an amount of water containing 0.67 percent by weight basis of Darvan$^{TM}$ to form a slurry containing about 34 percent by weight of water. This ceramic slurry has acceptable fluid properties for use in the method of manufacture of an open porous ceramic article according to the invention. This slurry may be forced into a previously formed porous block as defined herein by application of hydraulic pressure to a mold containing the previously formed porous block of bonded beads.

It is not within the scope of this invention to optimize the properties of the ceramic slurry. The slurry compositions described herein are provided to demonstrate operability of the invention. To provide best performance the properties of the desired type ceramic slurry should be characterized and empirically optimized, e.g. particle size distribution, viscosity, pH and setting time. Once optimized, these properties should be monitored and controlled to assure reliable, repeatable results.

In one preferred method according to the invention, a ceramic article having an open porous interior is made by taking a predetermined volume of pre-expanded polystyrene foam beads and coating them with a predetermined quantity of binder that is capable of being set. After the beads have been coated, they are placed in a mold and light pressure is applied to the coated beads in the mold until the binder sets resulting in the formation of a bound porous block. Thereafter the porous block is impregnated with a slurry of ceramic material. This may be accomplished by introducing the slurry above the porous block and placing a moveable piston or ram on top of the slurry and applying pressure to the piston or ram to force the ceramic slurry into the porous block through the application of hydraulic pressure. A vacuum may be applied to the porous block prior to or during introduction of the slurry to assist impregnation of the porous block.

After impregnation the block is dried at a temperature below which the pre-expanded polystyrene foam beads would begin to degrade. This is preferably accomplished by placing the impregnated block in an air convection oven having an air temperature of between about 100° and 150° C. until the moisture level of the ceramic material is reduced to not more than about eight percent and preferably lower. This may be conveniently accomplished by placing the impregnating porous block in the drying oven over night.

After drying the impregnated block is heated to cause the polystyrene to degrade and volatilize leaving a block of porous ceramic greenware. During this heating step, the organic binder also decomposes and volatilizes. This heating step may be conducted in an oxygen-containing atmosphere to facilitate removal and conversion of the organic materials.

After degradation and volatilization of the organic materials and particularly the pre-expanded polystyrene beads, the block of porous ceramic greenware is thereafter further heated to convert the ceramic greenware into finished ware. This heating step causes the particles of ceramic material to sinter or fuse together to form a ceramic article having a ceramic skin of low or no porosity and an open porous interior which has a continuous matrix of ceramic material that includes a plurality of chambers of predetermined shape and size distributed throughout the matrix. These chambers are derived from and correspond in shape to the beads although they are of somewhat smaller size than the beads due to shrinkage which occurs upon sintering. Due to the method of manufacture, these chambers are in communication with one another via passageways. When spherical particles are employed in making the porous block, the area available for fluid flow of each of these passageways is less than that of the spherical chambers that are brought into communication thereby. The cross-sectional area available for fluid flow of the passageways can be increased by increasing the pressure applied to the pre-expanded polystyrene foam beads during formation of the porous block of coated beads. Such pressure partially deforms the coated beads thereby increasing the amount of area of contact thereby increasing the area of the resultant passageways. Conversely, when the pressure applied to the coated beads does not deform them, the contact area is very low thereby resulting in very little passageway area. The resulting finished ware is highly porous but is not highly permeable and is suitable as thermal insulation. A ceramic skin covers all surfaces of the exterior of the finished ware.

When it is desired to provide an open porous article, the skin is removed, for example by sawing with a diamond-bladed bandsaw.

The following examples describe the preparation of ceramic articles having an open porous interior. According to the invention, all sieve analysis figures are percentages of fractions using Tyler equivalent mesh. The packing densities and bulk densities are given in grams per cubic centimeter (g/cc) and all fractions and ratios in this specification and the accompanying claims are given on a weight basis except where otherwise distinctly indicated.

EXAMPLE 1

A quantity of one millimeter diameter beads of pre-expanded polystyrene foam were coated with Canadian balsam (pine sap) and placed in a mold and a slight amount of pressure applied. The pressure applied did not crush the beads or deform them from a spherical shape. The mold was formed of aluminum foil bound with masking tape. Thereafter a slurry was made containing 60 percent solids in water. On a dry basis the solids were 20 percent by weight of CA-25 cement (calcium aluminate hydraulically setting cement available from Aluminum Company of America, Pittsburgh, Pa.) with the remaining 80 percent being calcined $Al_2O_3$, minus 325 mesh. This ceramic slurry was poured into the matrix and allowed to hydrate for two days while exposed to air at ambient temperature. Thereafter the impregnated block was dried in a circulating air oven having an interior temperature of 100° C. Following the oven drying step, the impregnated porous block was exposed to air at 400° C. to cause the pre-expanded polystyrene beads to be decomposed and volatilized. Thereafter the porous ceramic matrix was fired at 1400° C. for 18 hours. The skin of the resulting ceramic article was thereafter removed with a diamond-bladed band saw. The ceramic article cut very easily. The interior structure was very open porous and somewhat friable.

EXAMPLE 2

A quantity of 1 millimeter diameter pre-expanded polystyrene foam beads were bound together using a chemically setting epoxy system available from ABATRON Incorporated of Gilberts, Illinois 60136. One hundred parts of epoxy resin ABATRON™ 50-3 were combined with 13 parts of ABATRON™ hardener 50-12. The beads were coated by placing them in a beaker and stirring them while pouring in the epoxy. Subsequently the coated beads were placed in an aluminum foil mold and allowed to set for a full day. It is estimated that setting time was about 12 hours. Thereafter a slurry of the following composition was prepared: 2 percent bentonite, 16 percent CA-25 cement, 10 percent kaolin, 72 percent calcined $Al_2O_3$. The block of beads was positioned in a fixture so that a vacuum could be drawn through the porous block of beads during introduction of the slurry. Upon drying or setting of the slurry, cracking ocurred throughout the matrix. This is believed due to the bentonite swelling upon take up of the water from the slurry. This slurry did not impregnate the block readily because the slurry tended to gel and become thick shortly after mixing.

EXAMPLE 3

A block was prepared from 1,000 milliliters of pre-expanded polystyrene beads. One half of the beads were of small size (1–3 mm). The other half of the beads were of larger size (5–6 mm). A total of 40 grams of catalyzed epoxy was utilized in coating the beads, 20 grams of epoxy to each half. The small beads were first coated with the epoxy and placed into the bottom of an aluminum foil mold. Thereafter the remaining 500 ml of coated large beads were placed on top in the same aluminum foil mold. As in Example 2, the epoxy utilized was ABACAST™ 50–3 resin and ABACURE™ 50–12 hardener. Each portion of the beads was mixed by placing them in a HOBART™ mixer at a slow speed and adding the previously mixed catalyzed epoxy until the beads are initially coated and thereafter adjusting the mixer to at or near to its highest speed for about 2 minutes. The coated beads were allowed to remain in the mold over night while the epoxy set up. Thereafter the open porous bound bead block was cut to desired shape on a band saw. The resultant porous bound bead block was impregnated with a slurry of the following composition:

| | |
|---|---|
| CA-25 Calcium aluminate cement | 150 grams |
| kyanite | 100 grams |
| calcined $Al_2O_3$ | 250 grams |
| minus 325 mesh A-2 tabular alumina | 100 grams |
| water | 400 milliliters into which 3 cc of Foamex TM were added. |

Foamex is a trademark for a mixture of aliphatic esters available from Glyco Chemicals, Inc. It is employed to facilitate escapement of the air from the slurry as it impregnates the block. The porous bound bead block was readily impregnated with this mix. However, the mix apparently contained too much water and would not thicken or gel, and after removal of the block from the mold, part of the mix ran out of the impregnated block. Nevertheless, the impregnated block was fired in a kiln according to the following temperature-time schedule: ramp to 400° C. in two hours followed by soaking at 400° C. for three hours followed by a ramp to 1450° C. in 10 hours followed by soaking for 4 hours at 450° C. and thereafter a descending ramp to 20° C., i.e. ambient temperature. The resulting ceramic article had an open porous interior. The resulting ceramic article was cracked severely. This is believed due to the use of kyanite, which has a 16–17 percent expansion when it converts to mullite upon firing. The resulting ceramic article was very friable.

EXAMPLES 4-8

In each of the following examples, open porous blocks were made by taking between 7 and 8 thousand milliliters of beads and stirring with 150–250 gms of epoxy (Abatron™ Epoxy Resin 50–3 and ABATRON™ Hardener 50–12) in a large mixing bowl in a HOBART™ mixer. A sheet of plastic film was placed over the mix bowl to prevent the beads from overflowing the top of the bowl during the stirring cycle. In some of the following examples the amount of epoxy resin/hardener was reduced to a total of 150 gms. per 7–8 liters of pre-expanded polystyrene beads and this lesser amount was also found to be sufficient to bind the beads to one another. After the beads were coated with the epoxy resin/hardener, they were placed in steel-lined wooden molds that had been previously coated with grease or petrolatum. A spatula was used to spread out the beads as they were poured into a given mold. After filling of the mold a wooden plunger was inserted into the top of the mold and light pressure applied to compact the beads into contact with adjacent beads. Weights were placed on top of the plunger until the epoxy set, preferably overnight. The mold size was such that the open porous block dimensions were about 4¾ inches by 2½ inches by 9 inches, the 2½ inch dimension being that of the thickness of the block as set in the mold. After removal of the porous block from its forming mold, approximately ¼ inch of its width was sliced off to obtain a 4½ inch by 2½ inch by 9 inch rectangular block. The trimmed block was placed in a pressmold having dimensions closely approximating that of the trimmed block except that the depth or height of the mold sides exceeded that of the block (that is greater than about 2½ inches). The ceramic slurry was poured on top of the porous block while in its press mold and a plunger is placed onto the slurry and pressure applied to the plunger to force the ceramic slurry into the block of epoxy bound polystyrene beads. Approximately 1000 gms to 2000 gms dry weight basis of ceramic slurry are needed to fully impregnate a block of such dimensions. Before applying force to the plunger, note was taken as to how far down the plunger should travel before contacting the styrofoam block. It was not desired to compress the block; it was only desired to impregnate the block with a ceramic slurry. Full impregnation or saturation of the block with ceramic slurry was indicated by excess slurry being forced from around the plunger as the load on the plunger increased. Following impregnation the porous block was removed from the mold and placed under plastic film over night to permit full hydration and partial drying of the ceramic material. The following day the impregnated block was placed in a dryer at about 60° C. for 24 hours. Following this two-day hydration and drying cycle the dried block was fired to provide a porous ceramic article. The rate of temperature increase during firing was maintained low enough to enable the beads to degrade and volatilize before the ceramic material was fired into final form.

EXAMPLE 4

A ceramic slurry was formed which contained on a dry weight basis, 3 percent fumed silica powder, 7 percent zirconia $ZrO_2$, 15 percent CA-25 hydraulic cement, 58 percent tabular $Al_2O_3$ (type A-303 tabular alumina available from Aluminum Company of America minus 325 mesh) and 17 percent A-2 tabular alumina (minus 325 mesh). To this was added 375 milliliters of a water solution containing DARVAN in an amount of 3 cc per 500 milliliters of water. The resulting ceramic pressed very well into a porous block formed as described herein above. Upon firing, however, the product exhibited large cracks and much of it fell apart.

EXAMPLE 5

A porous block prepared as previously described was impregnated with a ceramic slurry having the following composition on a dry weight basis; three percent fumed silica powder, 7 percent $ZrO_2.SiO_2$, 20 percent CA-25, 55 percent tabular $Al_2O_3$ (type A-303 minus 325 mesh), 15 percent A-2 tabular alumina (minus 325 mesh). A slurry was made which on a weight basis contained 35.5 percent water. As in Example 4, the water contained DARVAN™ deflocculant. The porous block was readily impregnated with this slurry. Upon completion of the drying, decomposition and firing steps, the resulting ceramic article had an open porous interior, exhibited very little cracking and had very good strength. The product appeared to have about 10 percent shrinkage on a volume basis and did not fall apart upon handling.

EXAMPLE 6

A slurry was prepared from the following ingredients on a dry weight basis: 2 percent fumed silica powder, 10 percent CA-25 calcium aluminate cement, 3 percent $ZrO_2$ flour, 2 percent kaolin, 23 percent A-2 tabular alumina (minus 325 mesh), and 60 percent tabular $Al_2O_3$ (type A-303 minus 325 mesh). To a 1200 gram quantity of the ceramic ingredients proportioned as just described were added 480 milliliters of water. The resulting slurry contained 40 percent on a weight basis of water. The resulting slurry was readily pressed into the porous block. After drying the impregnated block dimensions were 2½ by 4½ by 8-15/16 inches. After subsequent heating of the dried impregnated block to degenerate the polystyrene beads and firing, the completed ceramic article had an open porous interior and dimensions of 2⅛ by 3¾ by 7½ inches. The resulting open porous ceramic article was of a nice appearance, was quite hard and exhibited a very small amount of cracking on its bottom surface. The resulting open porous ceramic article had a density of 0.64 grams per cc (by calculation based on its weight and dimensions). The resulting porous ceramic article contained about 83 percent by weight of alumina.

Of the Examples 1-6 the product of Example No. 6 was rated the best overall.

EXAMPLE 7

An open porous bound block of pre-expanded polystyrene beads was prepared utilizing 6 parts by volume of large beads (4–6 mm spheres) and 1 part by volume of small beads (1–3 mm spheres). To the 6 liters of large beads and 1 liter of small beads were added 170 grams of catalyzed epoxy. After the epoxy had set resulting block was impregnated with a ceramic slurry of the following composition: 100 grams CA-25, 30 grams $ZrO_2$ flour (minus 325 mesh), 20 grams kaolin, 230 grams A-2 tabular alumina (minus 325 mesh), 600 grams tabular alumina (type A-303 minus 325 mesh), and 30 grams of fumed silica powder. To the just described dry ingredients were added 375 ml water, and a slurry was formed by stirring. The resulting slurry was readily pressed into the open porous block of epoxy bound polystyrene beads. The ceramic article resulting after firing exhibited about 80 percent porosity that was of an open nature within the skin.

EXAMPLE 8

A porous block of epoxy bound pre-expanded polystyrene foam beads was prepared by taking 3 liters of beads (approximately 50 gms) and mixing them with 52 grams epoxy/hardener. The coated beads were placed in a mold to a depth of about four inches. The coated beads were compressed about 1 inch from the point where initial die contact occurred (33 percent compression based on original height). The load on the ram remained overnight while the epoxy set. Upon removal from the mold the block looked very similar in appearance to a block prepared in the absence of such substantial compression. The block was thereafter placed in a die and impregnated with a mix of the following composition: 30 gms fumed silica powder, 100 gms CA-25 calcium aluminate cement, 30 gms $ZrO_2$ flour (minus 325 mesh), 20 gms kaolin, 230 gms A-2 tabular alumina (minus 325 mesh), 600 gms tabular $Al_2O_3$ type A-303 (minus 325 mesh). To 500 gms mixture of the just described dry ingredients were added 200 ml of water to form a slurry. The resulting ceramic slurry was poured into the block which had been previously placed in a die. The piston was placed over the slurry and pressed thereby causing the slurry to impregnate the block. The die was thereafter inverted and the block pushed to the opposite side of the die. Thereafter a second mix was prepared utilizing the same dry ingredients in the same proportions previously described in this example. However, 250 ml of water were added to 500 gms of the dry ingredients. This second, thinner slurry was poured onto the opposite of the open porous block in the die, the plunger inserted and loaded to force the second mix into the block. The block appeared to be completely impregnated at completion of this technique.

The foregoing description and embodiments are intended to illustrate the invention without limiting it thereby. It will be apparent to one skilled in the art that various modifications can be made in the invention without departing from its spirit or scope.

What is claimed is:

1. A method of making a ceramic article having an open porous interior comprising the sequence of steps:

(a) coating a predetermined volume of thermally degradable organic beads with a predetermined quantity of thermally degradable binder capable of being set;

(b) forming a slurry of ceramic material including a chemically setting cement;

(c) mixing the coated beads and ceramic slurry together and placing the resulting mixture in a mold;

(d) applying pressure to the mixture in the mold to remove any excess slurry and causing the coated beads to contact one another;

(e) maintaining pressure on the mixture in the mold until the binder sets and the cement sets resulting in formation of a body in which the beads contact one another;

(f) drying the body;

(g) heating the dried body thereby causing the beads and binder to degrade and volatilize leaving ceramic greenware; and thereafter (h) further heating the ceramic greenware to form a porous ceramic article comprising a continuous matrix of ceramic material including a plurality of chambers of shape corresponding to that of the thermally degradable beads and of a size smaller than that of the thermally degradable beads distributed throughout the matrix wherein said chambers are in communication withone another via passageways whose area available for fluid flow is less than that of the chambers brought into communication thereby.

2. The method of claim 1 wherein the organic beads are selected from the group consisting of pre-expanded polystyrene and polyurethane and range in diameter from about 1 mm to about 6 mm.

3. The method of claim 1 wherein the binder is an epoxy resin.

4. The method of claim 1 wherein a surface of the mold is porous and has a pore size smaller than that of the organic beads.

5. The method of claim 3 wherein the body is dried by elevating its temperature and holding it at an elevated temperature less than that which causes chemical degradation of the organic beads until the moisture content of the body does not exceed eight percent by weight.

6. The method of claim 1 wherein the dried body is heated to a temperature of between 150° and 400° C. and held within such temperature range for a time sufficient to degrade and volatilize the beads.

* * * * *